United States Patent [19]

Hart

[11] Patent Number: 5,693,703

[45] Date of Patent: *Dec. 2, 1997

[54] WATER-BASED, SOLVENT-FREE OR LOW VOC, TWO-COMPONENT POLYURETHANE COATINGS

[75] Inventor: Richard E. Hart, Irvine, Calif.

[73] Assignee: R. E. Hart Labs, Inc., Irvine, Calif.

[ * ] Notice: The term of this patent shall not extend beyond the expiration date of Pat. Nos. 5,352,733 and 5,508,340.

[21] Appl. No.: 614,430

[22] Filed: Mar. 12, 1996

Related U.S. Application Data

[62] Division of Ser. No. 303,356, Sep. 9, 1994, Pat. No. 5,508,340.

[51] Int. Cl.$^6$ .................................................. C08L 67/00
[52] U.S. Cl. .......................... 524/502; 524/513; 524/539; 252/182.26
[58] Field of Search .................. 252/182.26; 524/502, 524/513, 539

[56] References Cited

U.S. PATENT DOCUMENTS

| | | | |
|---|---|---|---|
| 4,066,591 | 1/1978 | Scriven et al. | 204/159.11 |
| 4,608,413 | 8/1986 | Nachikamp et al. | 524/840 |
| 4,840,991 | 6/1989 | Sekmakas | 524/812 |
| 4,945,128 | 7/1990 | Hille et al. | 524/839 |
| 4,948,829 | 8/1990 | Mitsuji et al. | 524/457 |
| 5,025,061 | 6/1991 | Ishidoya et al. | 524/539 |
| 5,075,370 | 12/1991 | Kubitza et al. | 528/75 |
| 5,331,039 | 7/1994 | Blum et al. | 524/513 |
| 5,352,733 | 10/1994 | Hart | 428/423.1 |
| 5,484,842 | 1/1996 | Lewarchek et al. | 524/608 |
| 5,508,340 | 4/1996 | Hart | 524/591 |
| 5,552,477 | 9/1996 | Dhein et al. | 524/591 |

FOREIGN PATENT DOCUMENTS

WO 9309157  5/1993  WIPO .

OTHER PUBLICATIONS

"Waterborne Polyurethanes", Journal of Coated Fabrics vol. 16, Jul. 1986 pp. 39–79.

*Primary Examiner*—Rachel Gorr
*Attorney, Agent, or Firm*—Michael Leach; William F. Marsh

[57] ABSTRACT

A substantially solvent free aqueous two-component coating composition dispersion which, when applied to a substrate, cures to a film having properties of adhesion and bonding which are equal to or superior to films obtained from conventional solvent-based two-component polyurethane or epoxy systems. The first component is a combined aqueous polyol phase and an amine phase. The polyol phase a member consisting of an acid containing polyol or a blend of polyols containing an acid containing polyol such that the average hydroxyl functionality of the polyol phase is at least 1.5 and has an acid number of between about 15 and 200. The amine phase is an amine or blend of amines containing active hydrogens reactive with NCO groups such that the average active hydrogen functionality is at least 1.5. The amine phase is present in a quantity sufficient to substantially neutralize the acid containing polyols. The second component is a member selected from the group consisting of an aliphatic polyisocyanate, a cycloaliphatic polyisocyanate and an aromatic polyisocyanate and adducts and mixtures thereof. The ratio between the isocyanate equivalents and the sum of the active hydrogen equivalents of the polyols and amines is at least 0.5:1 and is preferably at least 1.1:1. The preferential reaction of the isocyanate groups with the active hydrogen moieties from the polyols and amines results in both linear and crosslinking polymerization.

19 Claims, No Drawings

WATER-BASED, SOLVENT-FREE OR LOW VOC, TWO-COMPONENT POLYURETHANE COATINGS

This is a division of application Ser. No. 08/303,356 filed 9 Sep. 1994, issued as U.S. Pat. No. 5,508,340 on Apr. 16, 1996. Said patent application is expressly incorporated herein by reference.

This invention relates to water based, solvent free two component polyurethane protective coatings. More particularly, this invention relates to a water based, solvent free two component crosslinked aliphatic polyurethane-polyurea protective coating system which possess performance properties which are equal to, or even better than the conventional solvent based two-component polyurethane or polyurethane-polyurea systems.

BACKGROUND OF THE INVENTION AND CURRENT STATE OF THE ART

For over 40 years water-bone, or water-based polyurethanes have been in existence. The performance properties of these systems have been improved continuously with literally hundreds of patents being issued during this period in the field of water-borne polyurethanes.

There are at least three important reasons why aqueous polyurethanes have become commercially important in the last few years. The first reason is environmental concerns regarding solvents and other volatile organic compounds ("VOC") being emitted into the atmosphere and causing ozone depletion, acid rain, and possibly a chemical imbalance of the earth's ecosphere. The second reason is economical. Organic solvent systems are expensive and aqueous polyurethane systems do not bear the extra solvent cost. The third, and perhaps most important, reason relates to the fact that aqueous polyurethanes have been improved to the point that, with regards to performance, they are comparable to or better than the conventional solvent-based polyurethanes for many specific applications.

Typical waterborne polyurethanes are actually polyurethane-polyurea polymers containing both urethane (—NH—CO—O—) and urea (—NH—CO—NH—) groups in a macromolecular chain. These groups are formed by well known polyaddition reactions. The addition reaction between polyisocyanates and polyols to form a urethane grouping may be depicted as:

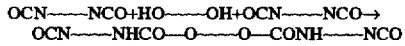

A similar polyaddition reaction between polyisocyanates and amines to form a urea grouping may be represented as:

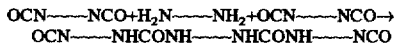

Most current waterborne polyurethanes have one manufacturing process in common. In the first phase of production, a medium molecular weight "prepolymer" is synthesized in a reactor at an elevated temperature (60°–100° C.) leaving approximately 2% to 8% free/terminal unreacted isocyanate (—NCO) groups. In order for this type of polyurethane to have high-performance properties, e.g., flexibility, hardness, acid, solvent and other chemical resistance, it must be chain-extended in the water phase. The chain-extension phase is a build-up of the prepolymer to a polyurethane having a high molecular weight.

This high molecular weight build-up is usually performed by reacting the NCO groups of the prepolymer with amines. Two important problems must be dealt with during the course of this reaction: (1) the control or stabilization of the extremely fast urea formation reaction, (e.g. ——NCO+ NH$_2$——→——NHCONH——) and (2) the control or minimizing of the ensuing viscosity build-up resulting from the increasing of the molecular weight. Because of this, the current state-of-the-art water-borne aliphatic polyurethane dispersions are limited to solids contents of 40% or lower. Moreover, their solvent resistance (as measured by methyl ethyl ketone "MEK" double-rubs) is generally limited to a maximum of 200 to 250 rubs and their resistance to chemicals such as Skydrol (jet aircraft hydraulic fluid), or jet fuels is very poor.

One attempt to solve the problems regarding viscosity (low solids of the dispersion) and high-performance, solvent and chemical resistance, has been to try to improve water-borne polyurethane dispersions by processing the reaction in a solvent as an intermediate aid to control the viscosity build-up during the critical chain extension phase. Typical of these processes are the so-called "acetone" or "NMP" (N-methylpyrrolidone) processes.

According to these types of processes, a polyol is reacted with a diisocyanate to form a prepolymer. Then, in the presence of a solvent, such as acetone or NMP, the prepolymer is reacted with a chain extender such as a polyamine, e.g. ethylenediamine or diethylenetriamine. The solvent based extended urethane polymer is then diluted with water forming an aqueous dispersion of the urethane prepolymer, aliphatic amine chain extended urethane polymer and solvent. The solvent must then be removed by distillation yielding an aqueous dispersion of urethane containing components ranging from the prepolymer to the highest molecular weight aliphatic amine chain extended polyurethane.

In this process the solvent must be distilled out of the system which still results in disposal problems with the resulting solvent. This is not a practical solution and there are relatively few commercial applications of this process.

The most popular process for manufacturing water-borne polyurethane's is the so called "prepolymer blending process." This process utilizes hydrophilically modified prepolymers having free terminal NCO-groups which are more compatible with aqueous systems. These prepolymers, possessing hydrophilicity, are therefore more susceptible to being chain extended with diamines in a water, as contrasted to a solvent, phase which helps build-up the molecular weight of the extended polyurethane polymers and further enhances the performance properties.

In order for this hydrophilic prepolymer blending/mixing process to function optimally, the dispersion phase must be performed in as short a period of time as possible and at temperatures below the critical point where NCO groups rapidly start to react with the water with the formation of carbamic acid groups and the following release of carbon dioxide. To optimize this process it is often necessary to use 5% to 15% w. levels of a co-solvent such as NMP to adjust for the viscosity build-up during the chain-extension and/or cross-linking phases. This process utilizes chain extension in the water-phase resulting in the prepolymers being either reacted with the difunctional amines to yield linear, flexible polyurethane-ureas, or cross-linked with polyfunctional amines which produces crosslinked systems. Waterborne polyurethanes of the cross-linked type contain a combination of ionic and nonionic internal emulsifiers. When compared to films made from the acetone process, the cured polyurethane films from this process exhibit improved solvent resistance when cross-linked with polyfunctional amines. Although this type of process, and variations thereof, is an improved system the films produced upon curing are almost always inferior to the two-component solvent based aliphatic fully crosslinked air-dry polyurethanes. It is believed this is due to the fact that the aqueous based chain extension is performed in a heterogeneous phase and therefore does not proceed as smoothly or as quantitatively as occurs in organic solvent systems, especially the two-component fully crosslinked systems.

Fully crosslinked aliphatic polyurethanes when prepared from solvent-based, two-component systems possess performance properties which are generally far superior to any of the current water based or water borne prepared polyurethanes. These solvent-based two-component fully crosslinked aliphatic polyurethanes can be formulated to provide cured films which resist 30-days submersion in Skydrol (jet aircraft hydraulic fluid) and also resist over 1000 double MEK rubs. Such solvent-based systems contain absolutely no added water and have very low levels of moisture content.

Much has been done toward improving the solvent and chemical acid resistance of water borne polyurethanes. For example, the post treatment of the dispersions with polyaziradines by the user, the use of blocked NCO additions to the dispersion and the use of bake curing with further crosslinking due to the temperature increase have all resulted in improved cured films from water dispersions. Another approach is to replace a portion of the typical polyurethane with other types of polymers. This usually results in aqueous systems which have acrylated or vinyl monomers grafted in the main chain. However, such grafted polymers are not 100% polyurethane and certain areas of performance still do not measure up to the solvent based, two-component polyurethane films.

Representative of the prior art water containing urethane preparations is Schriven, et al., U.S. Pat. No. 4,066,591. Many of the problems encountered with water based polyurethanes are described in that patent. Also, the specification delineates in some detail the various types of isocyanates, polyols, compounds containing active hydrogen atoms, chain extenders and the like which can be used in making polyurethane films and coatings. For that reason, this specification and its definitions are incorporated herein by reference.

A more recent and excellent review of the state of the art in waterborne polyurethanes is found in Rosthauser et al., "Waterborne Polyurethanes", *J. Coated Fabrics*; Vol. 16, Jul. 1986, pp. 39–79.

An aqueous polyurethane dispersion, prepared by heating a polyester-polyol and an isocyanate, is shown by Hille et al., U.S. Pat. No. 4,945,128. In the process disclosed, an aqueous dispersion is preferably prepared using a water miscible organic solvent, such as acetone or methyl ethyl ketone (MEK), which boils below 100° C. to dissolve or disperse the polyester-polyol and isocyanate. Heating the dispersion causes the polyols and NCO groups to react forming a urethane. The solvent is distilled off at a lower temperature before the heating process or during the heating of the components. In any event, the product produced is a cross-linked microparticle dispersion allegedly suitable for coating of various substrates.

Other patents also relate to two component coating compositions comprising acidic polyester-polyols combinable in some fashion with polyisocyanate components in an aqueous environment to form polyurethane coatings. Some are first combined with an isocyanate to form a polyurethane prepolymer. For example, Nachtkamp et al., U.S. Pat. No. 4,608,413 teaches aqueous stoving laquers containing pigments or fillers. These are based on combinations of a polyurethane prepolymer containing partly or completely neutralized carboxyl groups and blocked isocyanate groups and polyurethane prepolymers containing free hydroxyl groups and partly or completely neutralized carboxyl groups.

Kubitza et al., U.S. Pat. No. 5,075,370 discloses two-component aqueous coating compositions comprising an acidic polyol component containing at least one hydroxyl-containing polymer having an acid carboxylate or sulfonate group and a polyisocyanate.

Blum et al., U.S. Pat. No. 5,331,039 relates to water-based binder compositions containing a mixture of at least two hydroxyl functional polyols with each of the polyol groups having an acidic function. The organic polyisocyanate is emulsified in a mixture of acidic polyols such that the NCO:OH equivalent ratio is between 0.2:1 and 5:1.

Application, Ser. No. 08/028,966 filed Mar. 10, 1993, which is now U.S. Pat. No. 5,552,733, discloses a water based, solvent free, two component polyurethane-polyurea dispersion containing up to 65% solids. The first component is a polyester-polyol phase and an aqueous amine phase mixture. The polyester-polyol phase is a combination of modified polyester-polyols, low viscosity polyether or polyester-polyols, chain extending low molecular weight polyols, neutralizing amines and a detergent. The amine phase is an combination of neutralizing and chain extending amines having ratios preformulated to provide a balanced chain extending cross-linking reaction in aqueous phase with —NCO reactive groups. The polyester-polyol and amine phases are combined in water at room temperature to form an aqueous component having a solids content of 33 to 48% and has an equivalent ratio between polyester-polyol phase and amine phase of 1.75:1 to 2:25:1. The second component is a 100% reactive aliphatic isocyanate having a viscosity of between 1000–3500 cps at 25° C. and provides an NCO to functional groups in the polyester-polyol/amine component ratio of between about 1:1.3 to 1:1.7. This solvent free dispersion dries to a film coating having properties equal to conventional solvent based polyurethane coatings. The performance characteristics of the polyurethane coatings resulting from this two-component dispersion are superior to prior art water based composition and equal or exceed corresponding solvent based systems. The polyester/polyol and amine phases are made up of a mixture of various ingredients each of which is present to contribute to the high performance properties of the polyurethane coatings such as hardness, resistance to solvents, weather, abrasion, etc.

It would be desirable to formulate water-based polyurethane dispersions resulting in coatings having properties similar, or preferably superior, to those claimed in application Ser. No. 08/028,966, issued as U.S. Pat. No. 5,352,733, which do not require the addition of a separate detergent component and in which the polyol phase and amine components could be simplified and more easily prepared and combined. The present invention discloses and claims such compositions and their use.

OBJECTS AND BRIEF SUMMARY OF THE INVENTION

It is an object of the present invention to provide water-based, no or low VOC two-component polyurethane-polyurea dispersions which are fully cross-linked and chain extended in water and which are free or essentially free of volatile organic compounds or solvents and exhibit superior coating properties.

It is also an object of the present invention to provide a method of preparing water-based, solvent-free, two-component polyurethane-polyurea dispersions which are fully cross-linked and chain extended in water with hydroxyl and/or amine functionalities reacting with aliphatic, cycloaliphatic or aromatic isocyanates and are stable over an extended period of time for purposes of application to a substrate.

A further object of the invention is to provide water-based, no or low VOC two-component polyurethane-polyurea dispersions which do not require the presence of an added detergent.

A still different object of the present invention is to provide water-based two-component polyurethane-polyurea dispersions based on the reaction of an acidic polyol, with or without additional polyols present, and an amine which serves a dual purpose of neutralizing the acidic polyol and has reactive hydrogen functionalities which also serve as a chain extenders and/or cross linkers.

Another object of this invention is to provide aqueous dispersions of chain extended polyurethane-polyurea polymers which contain a high solids content but possesses low viscosity properties without the use of organic solvents.

An additional object of this invention is to provide water-based, solvent-free, two-component polyurethane-polyurea dispersions which, when applied to a substrate, cure to a film having properties of adhesion and bonding which are equal to or superior to films obtained from conventional solvent-based two-component polyurethane or epoxy systems.

These and other objects may be obtained by means of a two component solvent free system. The first component is formed by admixing two components in an aqueous phase. The first component is a polyol phase selected from the group consisting of an acidic polyol, an acidic polyol polymer, a blend of a non-acidic polyol and an acidic polyol, a blend of a non-acidic polyol and an acidic polyol polymer and a blend of a non-acidic polyol polymer and a acidic polyol polymer and mixtures of these combinations. The second component is an aqueous amine phase. As noted, the polyol phase can be a single component or blend of various monomeric and polymeric polyol components with the only limitation being that the polyol phase has an average hydroxyl functionality of at least 1.5 and an acid number of between about 15 and 200. The amine phase can be a single amine or blend of amines containing active hydrogens reactive with NCO groups such that the average active hydrogen functionality of the amine or amine blend is at least 1.5 or greater. The amine or amine blend is present in a quantity sufficient to substantially neutralize the acid number of the polyol phase.

The polyol can be a variety of components or blend of components providing the stated criteria are met. For example the polyol can be acid functionalized by containing a member selected from the group consisting of a polyester diol containing an acid group, a reaction product of a polyhydric polyether and a dicarboxylic acid or anhydride thereof and a reaction product of an ethylenically unsaturated acid, an ethylenically unsaturated alcohol and an ethylenically unsaturated ester.

Preferred acidic polyols are polyester diols containing an acid group wherein the acid functionality can be either a carboxylic or sulfonic acid. Various combinations can be formulated to provide polyester diols. For example members selected from the group consisting of (a) the reaction product of a dihydric polyol, a trihydric polyol and a dicarboxylic acid and anhydrides thereof; (b) the reaction product of a dihydric polyol, a dicarboxylic acid and a tricarboxylic acid and anhydrides thereof; (c) the reaction product of a polyhydric alcohol and a dicarboxylic acid or anhydride thereof and (d) polyols containing pendant tribasic aromatic acid functionalities such as those resulting from the esterification of dicarboxy benzene sulfonic acids. Particularly preferred are acidic polyester diols wherein at least a portion of the acid functionality is present as an α,α-dimethylol alkanoic acid of the formula:

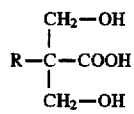

wherein R is an alkyl group of 1 to 8 carbon atoms.

The acidic polyol can be a single component or can be present as blends of acidic polyols provided the polyol phase has an acid number of between about 15 and 200.

Preferably the polyol will be a blend of acidic polyols and other members selected from the group consisting of a monomeric polyol selected from the group consisting of diols, triols, higher polyfunctional alcohols, oxyalcohols and mixtures thereof and a polymeric polyol selected from the group consisting of polyester polyols, polyether polyols, polyamide polyols, polyesteramide polyols, polycaprolactone polyols and acrylic interpolymer polyols and mixtures thereof and mixtures or blends of monomeric and polymeric polyols.

The overall polyol phase will have a hydroxyl functionality of at least 1.5 and an acid number of between about 15 and 200.

In referring to the polyol or acidic polyol component(s), the OH functionality can be replaced by a mercaptan (SH) functionality and the carboxylic acid groups can be substituted or replaced by sulfonic acid groups as is appropriate with the only limitation being the operability of the polyol or acidic polyol component for its intended purpose.

Any variety of amines or blend of amines can be utilized with the proviso that such must contain active hydrogens reactive with NCO groups such that the average active hydrogen functionality of the overall amine or blend of amines is at least 1.5 or greater and the amines being present in a quantity sufficient to substantially neutralize the acidic functionality of the polyol.

Suitable amine or blend of amines may comprise a member selected from the group consisting of primary and secondary aliphatic, cycloaliphatic and aromatic amines; tertiary aliphatic amines; alkanol amines, dialkanol amines, trialkanol amines; polyamines selected from the group consisting of aliphatic, alicyclic and aromatic diamines, triamines and tetraamines; oxyalkyleneamines, poly(alkylene) diamines and poly(oxyalkylene)triamines and mixtures thereof. When a tertiary amine is present which does not contain an active hydrogen, the overall amine phase must still meet the active hydrogen functionality of at least 1.5.

The neutralized blend of polyols and amines is formed in aqueous phase at ambient temperature resulting in a polyol/amine aqueous component having a solids content of between about 25 to 65% by weight.

This neutralized polyol/amine blend is completely miscible and/or dispersible in the aqueous phase and does not require the presence of added detergents or surface active agents to obtain an homogeneous aqueous blend. However, that is not to say that added detergents and/or surface active agents cannot be used if desired.

The second component is a essentially 100% solids aliphatic, cycloaliphatic or aromatic isocyanate or mixture of various aliphatic, cycloaliphatic and/or aromatic isocyanates. The ratio between the isocyanate equivalents and the sum of the active hydrogen equivalents of the polyols and amines is at least 0.5:1 but is preferably greater.

It is preferred to utilize as a polyol phase an acidic polyol or blend of polyols having an acidic polyol component wherein the polyol phase has an average hydroxyl functionality of at least 2 and an acid number of between about 15 and 200. The average active hydrogen functionality of the polyol/amine blend will preferably be at least 2 and the ratio between NCO equivalents and the sum of active hydrogen equivalents will be at least 1.1:1. In other words it is preferable that the amount of isocyanate used is sufficient to provide an over indexing of —NCO groups to functional groups in the polyol/amine component to provide sufficient —NCO groups to maximize chain extension and crosslinking within the polyurethane-polyurea structure.

The first and second components are combined by simply stirring to provide a polyurethane-polyurea dispersion having up to 65% solids, and which, following complete cross linking has a pot life of several hours. The polyol and amine phase blends are formulated such that isocyanate precursors tend to react preferentially with polyols and amines in the aqueous phase as opposed to reaction with water. In preferred embodiments, the polyol and amine components are selected to react to provide optimal and selective reaction with the —NCO groups in the water phase to form tightly crosslinked polymer networks. Upon admixing, the mixture will have a pot life of up to several hours. This process, having no or low organic solvents contents, results in a polyurethane-polyurea product which, when fully cured at ambient temperatures, produces a crosslinked film having properties which equal or exceed the solvent-based two component polyurethanes.

These water based, solvent free, two component aliphatic polyurethane-polyurea films form coatings which resist 30 day Skydrol® immersion, survive over 1500 double MEK rubs and have better adhesion due to the bonding structure than their solvent based counterparts. Moreover, this aqueous system, after addition of the isocyanate, can be made up having a solids content of up to about 75% by weight without presenting problems associated with increased viscosity. A typical dispersion according to the present invention will have a solids content between about 35 and 75% and a viscosity suitable for typical coating application methods. The solids content can be lowered by dilution with ordinary tap water (or deionized water if desired) to as low as about 35% and still be functional.

Because of the low volume or lack of volatile organic components (VOCs), there is virtually no environmental pollution which, coupled with the performance properties, makes this a truly superior product.

DETAILED DESCRIPTION OF THE PREFERRED EMBODIMENTS

There follows a detailed description of the invention and of the best mode presently known in practicing the invention. However, it will be evident from a reading of this disclosure that other equivalent steps, or measures may be taken to arrive at the two component, solvent free polyurethane/polyurea dispersion.

While not fully understood in scientific terms, the process of the present invention is based on the preferential reaction of the isocyanate groups with the active hydrogen moieties other than water. The ensuing reactions with polyols and amines preferably results in both linear and crosslinking polymerization.

The system consists essentially of mixing together a two-component mixture consisting of first component comprising an aqueous blend of a polyol phase having an average hydroxyl functionality of at least 1.5 and an acid number of between 15 and 200, and an amine or blend of amines having an active hydrogen functionality of at least 1.5 with a second component consisting of an aliphatic, cycloaliphatic or aromatic polyisocyanate.

It is to be noted that a common property of the polyol and reactive amine components is that they both must contain "active" hydrogen atoms. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include —OH, —SH, —NE, and —NH$_2$ groups in an appropriate combination.

The OH and SH functions are similar in properties and will therefore be included herein by terminology such as "diol" or "hydroxyl" groups. In other words, thiol and mercaptan groups are included in the above terminology. The hydrocarbon or substituted hydrocarbon moieties attached through the oxygen or sulfur to each "active hydrogen atom" group can be aliphatic, aromatic, cycloaliphatic or of a mixed type not including carbonyl, phosphoryl or sulfonyl linkages.

Polyol

The polyol phase portion of the polyol/amine blend must contain a hydroxyl functionality of at least 1.5 and have an acid number of between about 15 and 200. If desired, the polyol phase can be made up of 100% by weight of acidic polyol components but will preferably be a blend of acidic polyol and non-acidic polyol components. The polyol phase will include such components or mixture of components to provide a polyol phase having an average hydroxyl functionality of at least 1.5 and preferably 2 and an acid number of between about 15 and 200.

When referring to the acidic polyol component or components, the use of the terms "acidic polyol", "acid containing polyol" or "acid polyol component" or any similar phrase is meant to include acidic polyol components which will provide the overall polyol phase with an acid number of between about 15 and 200. The acid containing polyol can be an acidic diol monomer or a polymeric backbone having incorporated therein acidic functional groups as will be more fully illustrated below.

The presence of the acid functionality of the polyol is essential to the functioning of the invention. When the acid is neutralized by the amine phase containing the active hydrogen functionalities, it is ionized to a carboxylate (or sulfonate) ion to impart water solubility or dispersibility to the components and also provides an active hydrogen for the isocyanate to react with to form high polymers containing polyurea groups. For this reason, the acid number of the polyol phase much be in the range of between about 15 and 200.

The acidic polyol can be formulated in a variety ways. In one embodiment the acid containing polyol comprises a reaction product of a polyhydric polyether and a dicarboxylic acid or anhydride thereof.

Any suitable polyhydric polyether or polyalkylene ether polyol may be used including those which have the following structural formula:

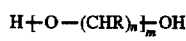

where the substituent R is hydrogen to lower alkyl including mixed substituents, and n is typically from 2 to 6 and m is from 2 to 100 or even higher. Included are poly (oxytetramethylene) glycols, poly(oxyethylene) glycols, polypropylene glycols and the reaction product of ethylene glycol with a mixture of propylene oxide and ethylene oxide.

Also useful are polyether polyols formed from the oxyalkylation of various polyols, for example, glycols such as ethylene glycol, 1,6-hexanediol, bisphenol A, and the like, or higher polyols, such as trimethylol propane, pentaerythritol and the like. Polyols of higher functionality which can be utilized as indicated can be made, for instance, by oxyalkylation of compounds such as as sorbital or sucrose. One commonly utilized oxyalkylation method is to react a polyol with an alkylene oxide, for example, ethylene or propylene oxide, in the presence of an acidic or basic catalyst.

Besides poly(oxyalkylene) glycols, any suitable polyhydric polythioether may be used such as, for example, the condensation product of thioglycol or the reaction product of a polyhydric alcohol, such as disclosed herein for the preparation of hydroxyl polyesters, with thioglycol or any other suitable glycol.

These polyhydric polyethers may be reacted with a polycarboxylic acid or anhydrides thereof. Suitable polycarboxylic acids are low molecular weight polycarboxylic acids or anhydrides having between about 2 and 18 carbon atoms, e.g., oxalic acid, succinic acid, fumaric acid, phthalic acid, isophthalic acid, terphthalic acid, tetrahydrophthalic acid, hexahydrophthalic acid, adipic acid, azelaic acid, sebacic acid, maleic acid, glutaric acid, hexachloroheptanedicarboxylic acid, tetrachlorophthalic acid, trimellitic acid, and tricarballylic acid and their anhydrides as they exist.

In another embodiment the acid containing polyol comprises a reaction product of an ethylenically unsaturated acid, an ethylenically unsaturated alcohol and an ethylenically unsaturated ester. Exemplary of hydroxylated alkyl esters of ethylenically unsaturated acids are those containing hydroxy groups derived from monoacrylates or methacrylates of a diol such as hydroxyalkyl acrylates and methacrylates. Examples include acrylic acid and methacrylic acid esters of ethylene glycol and 1,2-propylene glycol such as hydroxyethyl acrylate and methacrylate and hydroxypropyl methacrylate as well as polyethylene glycol monoacrylate and polycaprolactone diol or polyol monoacrylate. Hydroxybutyl acrylate, hydroxyoctyl methacrylate, and the like are further examples of the hydroxyalkyl esters of the ethylenically unsaturated acids. Also useful are the hydroxy-containing esters of such unsaturated acids as maleic acid, fumaric acid, itaconic acid, and the like. The hydroxyalkyl ester generally has a molecular weight in the range of from about 100 to about 1500 and preferably from about 100 to about 1000.

The ethylenically unsaturated ester with which the hydroxyalkyl ester is copolymerized can be any ethylenically unsaturated ester copolymerizable with the hydroxyalkyl ester, the polymerization taking place through the ethylenically unsaturated linkages. These include esters of unsaturated organic acids, amides and esters of unsaturated acids, nitriles of unsaturated acids, and the like. Examples of such monomers include methyl methacrylate, acrylamide, acrylonitrile, dimethyl maleate and blends thereof, and the like.

Suitable ethylenically unsaturated acids include acrylic acid, methacrylic acid, crotonic acid, isocrotonic acid, sorbic acid, cinnamic acid, maleic acid, fumaric acid and anhydrides which exist, e.g. maleic anhydride.

For example hydroxylated alkyl and alkyl esters of methacrylic acid may be combined with methacrylic acid to form an acidic polyol.

Preferred are acid containing polyols which are polyester polyols containing a carboxylic acid or sulfonic acid group.

The polyester polyols can be prepared by the polyesterification of organic polycarboxylic acids or anhydrides thereof with organic polyols. Usually, the polycarboxylic acids and polyols are aliphatic or aromatic dibasic acids and diols but trifunctional acids and tri- or even higher polyols may be utilized.

The diols which are usually employed in making the polyester include alkylene glycols, such as ethylene glycol and butylene glycol, neopentyl glycol and other glycols such as hydrogenated Bisphenol A, cyclohexane diol, cyclohexane dimethanol, caprolactone diol (e.g., the reaction product of caprolactone and ethylene glycol), hydroxyalkylated bisphenols, polyether glycols, [e.g., poly (oxytetramethylene) glycol] and the like. However, other diols of various types and, as indicated, polyols of higher functionality can also be utilized. Such higher polyols can include, for example, trimethylol propane, trimethylol ethane, pentaerythritol, and the like, as well as higher molecular weight polyols such as those produced by oxyalkylating low molecular weight polyols [e.g. the reaction product of ethylene oxide and trimethylol propane at a mole ratio of about 10:1 to 30:1].

The polycarboxylic acids or anhydrides which can be utilized in the formation of polyester polyols are the same as those used for reacting with polyhydric polyethers identified above.

There are various combinations of polyols and acids which can be reacted to form acidic polyols. One embodiment includes the reaction product of a dihydric polyol, a trihydric polyol and a dicarboxylic acid and anhydrides thereof, e.g. the reaction product of hexanediol, trimethylol propane and adipic acid.

A second embodiment comprises the reaction product of a dihydric polyol, a dicarboxylic acid and a tricarboxylic acid and anhydrides thereof, e.g. the reaction product of hexanediol, adipic acid and trimellitic acid.

Yet another embodiment is the comprises the reaction product of a polyhydric alcohol and a dicarboxylic acid or anhydride thereof, e.g. the reaction product of glycerin and adipic acid.

A still different embodiment encompasses acid containing polyester/polyols containing pendant sulfonic acid groups, e.g. the reaction product of hexanediol, adipic acid and 2,4-dicarboxybenzenesulfonic acid wherein the esterification occurs through the carboxylic acid groups.

A particularly preferred embodiment comprises polyester/polyols wherein at least a portion of the acid function comes from the incorporation of a diol containing a carboxylic acid which is an α,α-dimethylol alkanoic acid of the formula:

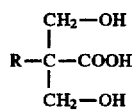

wherein R is an alkyl group of 1 to 8 carbon atoms.

The invention is not to be restricted to any particular acidic polyol inasmuch as combinations of acidic polyols may be utilized.

It will be generally preferred to utilize combinations of one or more acidic polyols blended with other non-acidic polyols to provide polyol blends having optimal performance characteristics.

The term polyol includes low molecular weight diols, triols and higher alcohols, low molecular weight amide-containing polyols and higher polymeric polyols such as polyester polyols, polyether polyols and hydroxy-containing acrylic interpolymers.

The low molecular weight diols, triols and higher alcohols useful in the instant invention are known in the art. They have hydroxy values of 200 or above, usually within the range of 1500 to 200. Such materials include aliphatic polyols, particularly alkylene polyols containing from 2 to 18 carbon atoms. Examples include ethylene glycol, 1,2-propanediol, 1,3-propanediol, 1,4-butanediol, 1,6-hexanediol; cycloaliphic polyols such as 1,2-cycloexanediol and cyclohexane dimenthanol. Examples of triols and higher alcohols include trimethylol propane, glycerol and pentaerythritol. Also useful are polyols containing ether linkages such as diethylene glycol and triethylene glycol and oxyalkylated glycerol.

Also useful are low molecular weight amide-containing polyols having hydroxyl values of 100 or above. When these low molecular weight amide-containing polyols are incorporated into the polymer, they enhance its water dispersability. Where flexible and elastomeric properties are desired a higher molecular weight polymeric polyol may be utilized. Suitable polymeric polyols include polyalkylene ether polyols including thio ethers, polyester polyols including polyhydroxy polyesteramides and hydroxyl-containing polycaprolactones and hydroxy-containing acrylic interpolymers.

The acidic polyols and other polyol ingredients utilized are simply mixed together at a low speed to form the polyol phase. When blended in a zero VOC system, there is no need for utilizing a closed reactor with the ingredients being under a dry nitrogen blanket to exclude atmospheric moisture, as is required for the manufacturing of the above mentioned prior art aqueous aliphatic polyurethane dispersions. Although the polyols are mixed and blended in the presence of atmospheric moisture, this is not a problem because now the process is advantageously carried out in a zero VOC water-based system. When prepared, the polyol phase blend will be essentially 100% polyol, however minor amounts of solvent or water are not to be excluded. As noted above, the polyol will have an average hydroxyl functionality of at least 1.5 and preferably of at least 2 and will have an acid number of between about 15 and 200.

Amine

Any terminology used in distinguishing the various amines, i.e. neutralizing and chain-extending, is for purposes of identification and not classification. Some amines can function both as neutralizing agents and chain-extenders and to attempt to categorize each only according to function would not be accurate. However, an amine or combination of amines is necessary in the functioning of the invention. The presence of the amine is required to neutralize the acid in the polyol and convert it to a salt so it has water miscibility, solubility, or dispersibility. Also, because of the active hydrogens, e.g. from amine hydrogens or hydroxyl groups on the amine, the amine can chain extend and crosslink the system by reacting with the isocyanate to form polyurethanes and polyureas.

Moreover, the combination of the acid polyol ingredient and the amine or amine blends functions as an efficient dispersant for all components in the two-component system, i.e. isocyanate and other polyols, and eliminates the need for the presence of an additional detergent or surface active agent to impart water solubility, emulsification or dispersibility to the system.

The amines which can be employed in the neutralization of the acid function and reaction with the isocyanate in the preparation of the urethanes of the invention can be members selected from the group consisting of ammonia, primary and secondary aliphatic, cycloaliphatic and aromatic amines; tertiary aliphatic and aromatic amines; alkanol amines, dialkanol amines, trialkanol amines; polyamines, e.g. aliphatic, alicyclic and aromatic diamines, triamines and tetraamines, oxyalkyleneamines and poly(oxyalkylene) diamines and poly(oxyalkylene)triamines and mixtures thereof. Ammonia and amines not having an active hydrogen or having insufficient active hydrogens, e.g. tertiary alkyl amines, can be utilized for their neutralizing ability provided the overall amine blend has an average active hydrogen functionality of at least 1.5 and preferably of at least 2.

The following are exemplary of amines which may be utilized but is not intended to be an exhaustive listing.

Representative of primary amines are $C_1$ through $C_{12}$ amines such as methylamine, ethylamine, propylamine, isopropylamine, 1,3-dimethylbutylamine, 3,3-dimethylbutylamine, 1-methylbutylamine, 2-methylbutylamine, 2-ethylbutylamine, isoamylamine, hexylamine, 1,5-dimethylhexylamine, 1,2-dimethylpropylamine, nonylamine, dodecylamine, cyclohexylamine, p-aminophenol and aniline.

Representative of secondary amines are diethylamine, dipropylamine, diisopropylamine, dibutylamine, diisobutylamine, N-methylethylamine. N-methylbutylamine, N-ethylbutylamine, N-methylcyclohexylamine, N-methylaniline.

Exemplary tertiary amines triethylamine, trimethylamine, tripropylamine, triisopropylamine, tributylamine and methyldiethylamine. Those having active hydrogens include triethanolamine, triisopropanolamine, N-ethyldiethanolamine, N,N-dimethylethanolamine, N,N-diethylethanolamine, 3-diethylaminopropanol, 1,3-bis(dimethylamino)-2-propanol, 5-diethylamino-2-pentanol, 1-diethylamino-2-propanol, 2-(diethylamino)-1,2-propandiol, 2-(diisopropylamino)ethanol, 3-diisopropylamino-1,2-propandiol, 1-dimethylamino-2-propanol, 3-dimethylamino-1-propanol, 3-dimethylaminopropylamine and tris(3-aminopropyl) amine. The tertiary amines may also be classified as alkanol amines, diamines, etc.

Typical alkanol amines are ethanolamine, 2-amino-1-butanol, 4-amino-1-butanol, 2-aminoethanthiol, 2-amino-1-hexanol, 2-amino-3-methyl-1-butanol, 2-amino-2-methyl-1-propanol, 2-amino-2-methyl-1,3-propanediol, 5-amino-1-pentanol, 3-amino-1-propanol, 2-(methylamino)ethanol, 2-(propylamino)ethanol and tris(hydroxymethyl) aminomethane.

Representative dialkanol amines are diethanolamine, dipropanolamine, diisopropanolamine, di-n-butanolamine, diisobutanolamine, 1-[N,N-bis(2-hydroxyethyl)amino]-2-propanol and N-methyldiethanolamine.

Suitable trialkanolamines are trimethanolamine, triethanolamine, triisopropanolamine.

Exemplary of the aliphatic, alicyclic and aromatic diamines, triamines and tetraamines are the following:

Suitable diamines may include ethylenediamine, hexamethylenediamine, 1,4-diaminobutane, 1,3-diaminopropane, 1,2-diaminopropane, 1,3-diaminopentane, 1,5-diaminopentane, 2-methylpentamethylenediamine, 1,7-diaminoheptane, 1,8-diaminooctane, 1,9-diaminononane, 1,10-diaminodecane, 1,12-diaminododecane, 1,3-diamino-2-hydroxypropane, 1,2-diamino-2-methylpropane, 3-(dibutylamine)propylamine, N-isopropylethylenediamine, N,N-dimethyl-N'-ethylenediamine, N,N,-dimethyl-1,6-hexanediamine, 2,5-dimethyl -2,5-hexanediamine, N-methylethylenediamine, N-methyl-1,3-propanediamine, N,N'-bis(2-aminoethyl)-1,3-propanediamine, N,N'-bis(3-aminopropyl)-1,3-propanediamine, N,N'-bis(2-hydroxyethyl)ethylenediamine, N-isopropyl-2-methyl-1,2-propandiamine, N,N-2,2-tetramethyl-1,3-propanediamine, isophorone diamine, propane-2,2-cyclohexyl amine, o-phenylene diamine, p-aminodiphenylamine, p-tolylene diamine, N,N'-dimethyl-o-phenylene diamine and N,N'-di-p-tolyl-m-phenylene diamine.

Representative triamines are diethylenetriamine and 3,3-diamino-N-methyldipropylamine.

Typical of tetraamines is triethylenetetraamine.

The oxyalkyleneamines and poly(oxyalkylene) di- and triamines may be represented by 3-ethoxypropylamine, poly(oxyethylene)amines, poly(oxypropylene)amines, poly(oxyethylene)diamines, poly(oxypropylene)diamines, poly(oxyethylene)triamines and poly(oxypropylene)triamines. Particularly suitable are the poly(oxyalkylene)diamines and poly(oxyalkylene)triamines distributed by Huntsman Chemical Company under the Jeffamine trademark, e.g. Jeffamine M600, D230, D400, ED600, ED2001, ED4000, ED6000, DU700, T3000 and the like.

The various amine components are blended together in water (tap water is suitable) to form a blend having an amine content of between about 20–100% by weight.

Addition of amine and polyol

The polyol and amine may be directly blended together at room temperature in an open vessel because there are no solvents to be concerned about.

There are various means or ways of formulating the polyol/amine component. Preferably the polyol phase is blended in a mixing tank with water containing any desired additives such as defoaming agents, surface tension reducing agents, agents to regulate pH (such as ammonia), etc. When utilized, any suitable defoaming agent or combination of agents, e.g. silicone or non-ionic acetylenic diols may be utilized and is not critical provided it is functional. This aqueous blend is formulated at room temperature. To this is blended the amine phase resulting in an overall polyol/amine component having a solids content of between about 33 and 80% by weight. If desired, the amine components of the amine phase can be added sequentially. One particular advantage of the polyester-polyol/amine component is that polyol blend and the amine blend can be formulated and shipped separately. These phases can then be blended with water at a suitable mixing site without the need of shipping water which can comprise over 50% of the final blend.

Isocyanate

The organic polyisocyanate which is used in the instant invention can be an aliphatic, cycloaliphatic or an aromatic polyisocyanate or mixture of these. Aliphatic or cycloaliphatic polyisocyanates are preferred since it has been found that they have selective reactivity. Also, diisocyanates are preferred although higher polyisocyanates can be used in place of or in combination with diisocyanates and/or monisocyanate. Where higher functionality polyisocyanates are used, some monofunctional isocyanate can be present to reduce the average functionality; however, the use of monofunctional isocyanates is not preferred. Examples of suitable higher polyisocyanates are 1,2,4-benzene triisocyanate and polyethylene polyphenyl isocyanate. Examples of suitable monisocyanates are cyclohexyl isocyanate, phenylisocyanate and toluene isocyanate. Examples of acceptable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, alpha, alpha-xylylene diisocyanate and 4,4-methylene-bis(cyclohexyl isocyanate). Substituted organic polyisocyanates can also be used in which the substituents are nitro, chloro, alkoxy and other groups which are not reactive with hydroxyl groups or active hydrogens and provided the substituents are not positioned to render the isocyanate group unreactive.

Thioisocyanates corresponding to the above-described can be employed as well as mixed compounds containing both an isocyanate and a thioisocyanate group. The terms "polyisocyanate" and "diisocyanate", as used in the present specification and claims, are intended to cover compounds and adducts containing thioisocyanate groups or isocyanate groups and compounds and adducts containing both isocyanate and thioisocyanate groups. Among these adducts are biurets of isocyanurates, uretdiones, carbodiimides, and prepolymers formed by the reaction of excess multifunctional isocyanates with polyols.

Particularly preferred isocyanate adducts are those based on hexamethylene diisocyanate (HDI).

This two-component system is completed by blending at least 0.5 isocyanate equivalents for each active hydrogen equivalent of the polyol/amine component. Preferably, there will be between about 1.1 and 3 isocyanate equivalents for each active hydrogen equivalent of the polyol/amine component with 1.3 to 2.0 isocyanate equivalents per polyol/amine active hydrogen equivalent being especially preferred. This amount of isocyanate used is sufficient to provide an over indexing of —NCO groups to functional groups in the polyol/amine. This provides sufficient —NCO groups to maximize chain extension and crosslinking within the polyurethane-polyurea structure.

This blend results in an aqueous, organic solvent free polyurethane dispersion having a solids content of between about 30 to 85%. This provide an excellent zero VOC protective coating blend for application to almost any substrate such as concrete, wood and metal. It is particularly suitable for application to substrates that are subject to spillage of corrosive chemicals, or to heavy traffic where abrasion resistance is required. It is also designed for use where a highly esthetic, extremely durable protective coating is required. It is an excellent coating for severe coastal, offshore or chemical environments where both corrosion protection and resistance to fading, peeling or chalking from exposure to sunlight are desired. Further, it is an outstanding anti-graffiti coating. It may be applied to clean and dry substrates at temperatures above about 50° F. and cleans up completely and easily with soap and water.

This two-component system cures through chemical reaction and is therefore not dependant on atmospheric conditions. Additionally, the blend is water reducible. When being thinned or reduced, ordinary tap water may be used. There is no limit to the amount of thinning or reducing which may take place. However, for best results the solids content of the reduced blend should not be less than about 35%.

The aqueous polyol/amine blend can have blended in coloring agents such as pigments, dyes, stains, etc. Additionally, other water-based additives may be blended in as leveling aids, thixotrops, anti-mar or anti-skid agents or any other agents which do not adversely affect the aqueous dispersion and its ability to coat and cure on a substrate.

EXAMPLE 1

An acidic polyester-polyol which is a hexanediol neopentyl glycol adipate partially reacted with trimellitic anhydride was utilized. It has an average molecular weight of about 1500 contains both carboxylic acid and hydroxyl sites. This polyol has an equivalent weight of about 1250, an acid value of about 50, a hydroxyl value of about 66 and a ratio of hydroxyl/acid functionality of about 1.8:1.3. The polyol is a pale waxy liquid having a viscosity at 25° C. of about 28,000 cps and at 60° C. of about 2,700 cps. For purposes of description, this acidic polyester-polyol will be referred to simply as "Polyol A".

Fifty grams of Polyol A was diluted with 50 mls of water to form a 50/50 by weight polyol/water blend. To this blend was added about 6 grams of triethanolamine having an equivalent weight of 149. The equivalent acid:amine ratio was 1:1 to provide sufficient amine to neutralize the acid function of the polyol.

To the polyol/amine blend was added 40 grams of 100% solids isocyanurate trimer of hexamethylene diisocyanate having and equivalent weight of about 181, thereby supplying sufficient NCO equivalents to provide an NCO/active hydrogen ratio of about 1.2:1. The resulting mixture was an aqueous polyurethane dispersion having a pot life in excess of two hours. When coated on a substrate it had a tack free dry time of about 5–7 hours and an approximate HB pencil hardness. Its ambient cure properties showed solvent resistance in the range of about 300–500 MEK rubs and moderate water resistance when immersed in water. The coating yellowed somewhat upon heating at 180° F.

EXAMPLE 2

Example 1 was repeated utilizing 4 grams of diethanol amine (equivalent weight of 105) as the amine to provide an equivalent acid to amine ratio of about 1:1. Forty eight grams of the isocyanate trimer of Example 1 was used to provide an NCO/active hydrogen ratio of about 1.5:1 with all other conditions being the same. The resulting mixture was an aqueous polyurethane dispersion having a pot life in excess of three hours. When coated on a substrate it had a tack free dry time of about 6–8 hours and a pencil hardness of F. Its ambient cure properties showed solvent resistance of about 300–500 MEK rubs and moderate water resistance when immersed in water. The coating remained clear upon heating at 180° F.

EXAMPLE 3

Example 1 was repeated utilizing 2 grams of 2-methyl-1,5-diaminopentane (MDP) (equivalent weight 58) as the amine to provide an equivalent acid to amine ratio of about 1:1. Twenty six grams of the isocyanate trimer of Example 1 was used to provide an NCO/active hydrogen ratio of about 1.5:1 with all other conditions being the same. The resulting mixture was an aqueous polyurethane dispersion having a pot life of less than one hour. When coated on a substrate it had a tack free dry time of about 4 hours resulting in a pencil hardness of H. Its ambient cure properties showed solvent resistance in excess of 500 MEK rubs and moderate water resistance when immersed in water. The coating remained clear upon heating at 180° F.

EXAMPLE 4

Example 1 was repeated utilizing a combination of 0.2 grams of 2-methyl-1,5-diaminopentane (MDP) (equivalent weight 58) and 3.0 grams of 28% ammonium hydroxide (equivalent weight 17) as the amine to provide an equivalent acid/amine ration of about 0.7:1. Thirty grams of the isocyanate trimer of Example 1 was used to provide and NCO/active hydrogen ratio of about 1.5:1 with all other conditions being the same. The resulting mixture was an aqueous polyurethane dispersion having a pot life of about 2 hours. When coated on a substrate it had a tack free dry time of about 6 hours resulting in pencil hardness of about HB. Its ambient cure properties showed solvent resistance of about 300–500 MEK rubs and moderate water resistance when immersed in water. The coating remained clear upon heating at 180° F.

EXAMPLE 5

Example 1 was repeated utilizing a combination of 2.8 grams of 2-amino-2-methylpropanol (AMP) (equivalent weight of 45) and 0.2 grams of 2-methyl-1,5-diaminopentane (MDP) (equivalent weight of 58) as the amine to provide an acid to amine ratio of about 0.6:1. Thirty five grams of the isocyanate trimer of Example 1 was used to provide and NCO/active hydrogen ratio of about 1.5:1 with all other conditions being the same. The resulting mixture was an aqueous polyurethane dispersion having a pot life of 2–3 hours. When coated on a substrate it had a tack free dry time of about 6 hours resulting in about B pencil hardness. Its ambient cure properties showed solvent resistance of about 300–500 MEKrubs and good water resistance when immersed in water. The coating remained clear upon heating at 180° F.

EXAMPLE 6

An aqueous polyol blend was made by combining 29 parts by weight of Polyol A, 25 parts by weight of a nonacidic polyester-polyol (King K-Flex 188) having an equivalent weight of 238, 1 part by weight of an amine blend (Amine A) made up of 50% diethanol amine, 10% MDP and 40% AMP, 1.3 parts by weight of 28% ammonium hydroxide, 5 parts by weight trimethylol propane (TMP), 0.5 parts by weight of an polyoxypropylenetriamine having a molecular weight of about 3000 (Jeffamine 3000), 36.2 parts by weight water, 1.0 part by weight of a UV stabilizer mixture (CIBA TINUVIN 292 and 1130) and 1.0 part by weight of a surfactant/defoamer mixture (Byk 346 Surfactant, Deefo defoamer). This blend had an acid equivalence of 0.023, and amine equivalence of 0.026 so that there was a slight excess of amine to neutralize the acid function and an active hydrogen equivalence of about 0.25.

A white pigmented solution was prepared by paint milling a mixture of about 55 parts by weight of the above polyol/amine with 28 parts by weight of $TiO_2$, 16 parts by weight water and 1.0 parts by weight of a surfactant mixture.

One hundred parts of the pigmented polyol/amine blend was then combined with 50 parts by weight of a the isocyanurate trimer of Example 1 resulting in an NCO/active hydrogen ratio of about 2:1.

This dispersion has a pot life of about 3.5 hours. A coating of this dispersion was placed on a substrate and had a tack free drying time of between about 4–5 hours. The coating cured air dry a 3H pencil hardness. Its ambient cure properties showed a solvent resistance of over 2000 MEK rubs and excellent water resistance when immersed in water for seven days. The coating did not yellow upon heating at 180° F. and showed excellent gloss retention in accelerated UV stability tests.

EXAMPLE 7

To 100 parts of the pigmented polyol/amine blend of Example 6 was combined 45 parts of a biuret trimer of hexamethylene diisocyanate (Miles N3200) resulting in a sprayable coating with an NCO/active hydrogen ratio of about 2:1. This dispersion has a pot life of about 2.5 hours and a tack free drying time of 4-5 hours. The cured film properties were almost equivalent to the values reported in Example 6.

EXAMPLE 8

An aqueous polyol blend was made by combining 29 parts by weight of Polyol A, 25 parts by weight of a nonacidic polyester-polyol (King K-Flex 165) having an equivalent weight of 238, 1.5 parts by weight of an amine blend (Amine B) made up of 30% triethanol amine, 40% MDP and 30% AMP, 1.3 parts by weight of 28% ammonium hydroxide, 5 parts by weight trimethylol propane (TMP), 36.18 parts by weight water, 1.0 part by weight of a UV stabilizer mixture (CIBA TINUVIN 292 and 1130), 1.0 part by weight of a flow control additive mixture (3M FC-120 Surfactant, Air Products DF574 Defoamer) and 0.02 parts of a tin catalyst [T12(DBTLD)]. This blend had an acid equivalence of 0.023, and amine equivalence of 0.030 so that there was an excess of amine to neutralize the acid function and an active hydrogen equivalence of about 0.25.

A white pigmented solution was prepared by combining about 55 parts by weight of the above polyol/amine with 28 parts by weight of $TiO_2$, 16 parts by weight water and 1.0 parts by weight of a surfactant mixture.

One hundred parts of the pigmented polyol/amine blend was then combined with 50 parts by weight of a the isocyanurate trimer of Example 1 resulting in an NCO/active hydrogen ratio of about 2:1.

This dispersion has a pot life of about 2.5 hours. A coating of this dispersion was placed on a substrate and had a tack free drying time of between about 5-7 hours. It had a 3-4H pencil hardness. Its ambient cure properties showed a solvent resistance of over 3000 MEK rubs and excellent water resistance when immersed in water for seven days. The coating did not yellow upon heating at 180° F. and showed excellent gloss retention in accelerated UV stability tests.

EXAMPLE 9

An aqueous polyol blend was made by combining 26.4 parts by weight of Polyol A, 13 parts by weight of a nonacidic aromatic polyester-diol (Stephan 4000) having an equivalent weight of 140, 1.5 parts by weight of an amine blend (Amine C) made up of 35% triethanol amine, 10% diethanol amine, 25% 1,3-pentanediamine and 30% AMP, 0.8 parts by weight of 28% ammonium hydroxide, 11 parts by weight trimethylol propane (TMP), 4.4 parts by weight of an polyoxypropylenetriamine having a molecular weight of about 3000 (Jeffamine 3000), 41.73 parts by weight water, 1.15 parts by weight of a surfactant/defoamer mixture (Byk 364 Surfactant, DF574) and 0.02 parts by weight of a tin catalyst [T12 (DBTDL)]. This blend had an acid equivalence of 0.021, and amine equivalence of 0.026 so that there was an acid/amine ratio of 0.8:1 providing an excess of amine to neutralize the acid function and an active hydrogen equivalence of about 0.37.

A black pigmented solution was prepared by paint milling a mixture of about 100 parts by weight of the above polyol/amine and 25 parts of an acid functional acrylic resin (Cook Chemical-Chempol 4301), 20 parts water and 10 parts by weight of a black pigment dispersion (Huls 896 W/B).

One hundred parts of the pigmented polyol/amine blend was then combined with 50 parts by weight of a the isocyanurate trimer of Example 1 resulting in an NCO/active hydrogen ratio of about 2:1.

This dispersion has a pot life of about 1.25-2 hours. A coating of this dispersion was placed on a substrate and had a tack free drying time of between about 4-5 hours. It had a 3-4H pencil hardness. Its ambient cure properties showed a solvent resistance of over 2000 MEK rubs and excellent water resistance when immersed in water for seven days. The coating showed excellent gloss retention when heated at 180° F.

EXAMPLE 10

A two liter reaction vessel, equipped with a mechanical stirrer, nitrogen atmosphere, heating and cooling system and a water separator, is charged with 1000 g of Ruco polyester diol, comprised of neopentyl glycol, hexanediol and adipic acid, having an average molecular weight of about 1000 and a hydroxyl number of 65. The polyol is heated to 150° F. with stirring and then 100 g of dimethylolpropionic acid and 0.5 g of p-toluenesulfonic acid catalyst are added. The temperature is increased to 260° F. over 30 minutes and is maintained at that temperature for about 10 hours while a slow nitrogen purge is maintained and about 10-12 g of water is collected in a cold trap. The reaction mixture is cooled to 180° F. and an acid number is run on the product. Typically a 10 g aliquot of succinic anhydride is added and the mixture is heated until the acid number is in the 45-50 range and the hydroxyl number is about 60.

A polyol amine blend, similar to that shown in Example 6, is prepared using 30 g of the above dimethylolpropionic acid containing polyester diol in place of Polyol A. This is combined with 20 g of an aliphatic polyester polyol (K-Flex 188), 1.5 g of an amine blend made up of 34% triethanolamine, 33% MDP and 33% AMP, 1.4 g of 28% ammonium hydroxide, 8 g of trimethylol propane, 37 g of water, 1 g of a UV stabilizer (Tinuvin 292) and 1 g of a surfactant/defoamer mixture. The blend has an acid equivalence of 0.025, an amine equivalence of 0.045 and an active hydrogen equivalence of about 0.35.

A clear coating is prepared by combining 100 parts of the above polyol/amine blend with 80 parts of the isocyanurate trimer of hexamethylene diisocyanate used in Example 1, such that the NCO/active hydrogen equivalence is 1.25:1. The resulting emulsion is reduced with 80 parts of water to afford a low viscosity dispersion with a solids content of about 54% and a potlife that would exceed 2 hours. A coating of this dispersion placed on a metal substrate would dry tackfree within 4-6 hours and undergo complete curing at ambient conditions in 5-7 days. The resulting film would have a pencil hardness of H-2H, resist 500+ MEK rubs, and remain colorless in QUV and 180° F. heat aging tests.

While the above shows a complete and preferred embodiment of the invention, it will be evident to those skilled in the art that certain modifications and/or substitutions may be made without departing from the scope of the invention which is limited only by the appended claims and functional equivalents thereof.

I claim:

1. A polyol composition for use in making aqueous coating formulations consisting essentially of, in an aqueous phase which is substantially organic solvent free:
   (a) a polyol component comprising an acid containing polymer polyol and a trifunctional or tetrafunctional alcohol such that the polyol component has an average hydroxyl functionality of at least 1.5, and an acid number of between about 15 and 200; and (b) an amine component comprising an amine or blend of amines and containing active hydrogens reactive with NCO groups such that the average active hydrogen functionality of the amine component is at least 1.5, the amine or amine blend comprising at least one primary amine, or at least one secondary amine, or both, and being present in a quantity sufficient to substantially neutralize the acidic functionality of the polyol component.

2. The polyol composition of claim 1 in which the polyol component has a hydroxyl functionality of at least 2, the amine or amine blend has an average active hydrogen functionality of at least 2, and the acid containing polymer polyol is selected from the group consisting of (1) the reaction product of a polyhydric polyether and a polyfunctional carboxylic acid or anhydride thereof;

(2) the reaction product of an ethylenically unsaturated acid, an ethylenically unsaturated alcohol and an ethylenically unsaturated ester; and (3) the reaction product of a polyester polyol and a polyfunctional carboxylic acid or anhydride thereof;

and mixtures thereof;.

3. The polyol composition of claim 2 in which the polyol component further comprises a non-acidic polyol and the trifunctional or tetrafunctional alcohol is a triol selected from the group consisting of trimethylol propane, trimethylol ethane and glycerol.

4. The polyol composition of claim 1, in which the acid containing polymer polyol is a polyester polyol and contains, as a reacted component, a tribasic aromatic acid.

5. The polyol composition of claim 1, in which the acid containing polymer polyol is a polyester polyol and contains, as a reacted component, a diol containing a carboxylic acid group.

6. The polyol composition of claim 3 in which the non-acidic polyol is a polymer polyol selected from the group consisting of polyester polyols, polyether polyols, polyamide polyols, polyesteramide polyols, polycaprolactone polyols and hydroxy-containing acrylic polymers and mixtures thereof.

7. The polyol composition of claim 6 in which the non-acidic polymer polyol is a polyester polyol.

8. The polyol composition of claim 7 in which the acid containing polymer polyol is a polyester polyol and contains, as a reacted component, a tribasic aromatic acid.

9. The polyol composition of claim 2 in which the polyol component further comprises a non-acidic polyester polyol and the trifunctional or tetrafunctional alcohol is a triol selected from the group consisting of trimethylol propane, trimethylol ethane and glycerol and the amine component comprises a dialkanolamine, an aliphatic diamine and ammonia.

10. The polyol composition of claim 3 in which the amine or blend of amines is at least one member selected from the group consisting of aliphatic, cycloaliphatic and aromatic amines; alkanol amines, dialkanol amines, polyamines selected from the group consisting of aliphatic, alicyclic and aromatic diamines, triamines and tetramines; oxyalkyleneamines, poly(oxyalkylene)diamines and poly(oxyalkylene)triamines.

11. The polyol composition of claim 4 in which the amine or blend of amines is at least one member selected from the group consisting of aliphatic, cycloaliphatic and aromatic amines; alkanol amines, dialkanol amines, polyamines selected from the group consisting of aliphatic, alicyclic and aromatic diamines, triamines and tetramines; oxyalkyleneamines, poly(oxyalkylene)diamines and poly(oxyalkylene)triamines.

12. The polyol composition of claim 6 in which the amine or blend of amines is at least one member selected from the group consisting of aliphatic, cycloaliphatic and aromatic amines; alkanol amines, dialkanol amines, polyamines selected from the group consisting of aliphatic, alicyclic and aromatic diamines, triamines and tetramines; oxyalkyleneamines, poly(oxyalkylene)diamines and poly(oxyalkylene)triamines.

13. The polyol composition of claim 7 in which the amine or blend of amines is at least one member selected from the group consisting of aliphatic, cycloaliphatic and aromatic amines; alkanol amines, dialkanol amines, polyamines selected from the group consisting of aliphatic, alicyclic and aromatic diamines, triamines and tetramines; oxyalkyleneamines, poly(oxyalkylene)diamines and poly(oxyalkylene)triamines.

14. The polyol composition of claim 8 in which the amine or blend of amines is at least one member selected from the group consisting of aliphatic, cycloaliphatic and aromatic amines; alkanol amines, dialkanol amines, polyamines selected from the group consisting of aliphatic, alicyclic and aromatic diamines, triamines and tetramines; oxyalkyleneamines, poly(oxyalkylene)diamines and poly(oxyalkylene)triamines.

15. The polyol composition of claim 4 in which the amine component also contains ammonia or a tertiary amine, or both and which contains 33–80 wt % solids.

16. The polyol composition of claim 5 in which the amine component also contains ammonia or a tertiary amine, or both and which contains 33–80 wt % solids.

17. The polyol composition of claim 6 in which the amine component also contains ammonia or a tertiary amine, or both and which contains 33–80 wt % solids.

18. The polyol composition of claim 7 in which the amine component also contains ammonia or a tertiary amine, or both and which contains 33–80 wt % solids.

19. The polyol composition of claim 8 in which the amine component also contains ammonia or a tertiary amine, or both and which contains 33–80 wt % solids.

* * * * *